Nov. 24, 1964     J. ROBBINS ETAL     3,158,105
CONVEYOR APPARATUS
Filed Sept. 5, 1962     6 Sheets-Sheet 1

*Inventors*
Joseph Robbins
Frank R. Smith
By their Attorney
Robert E. Ross

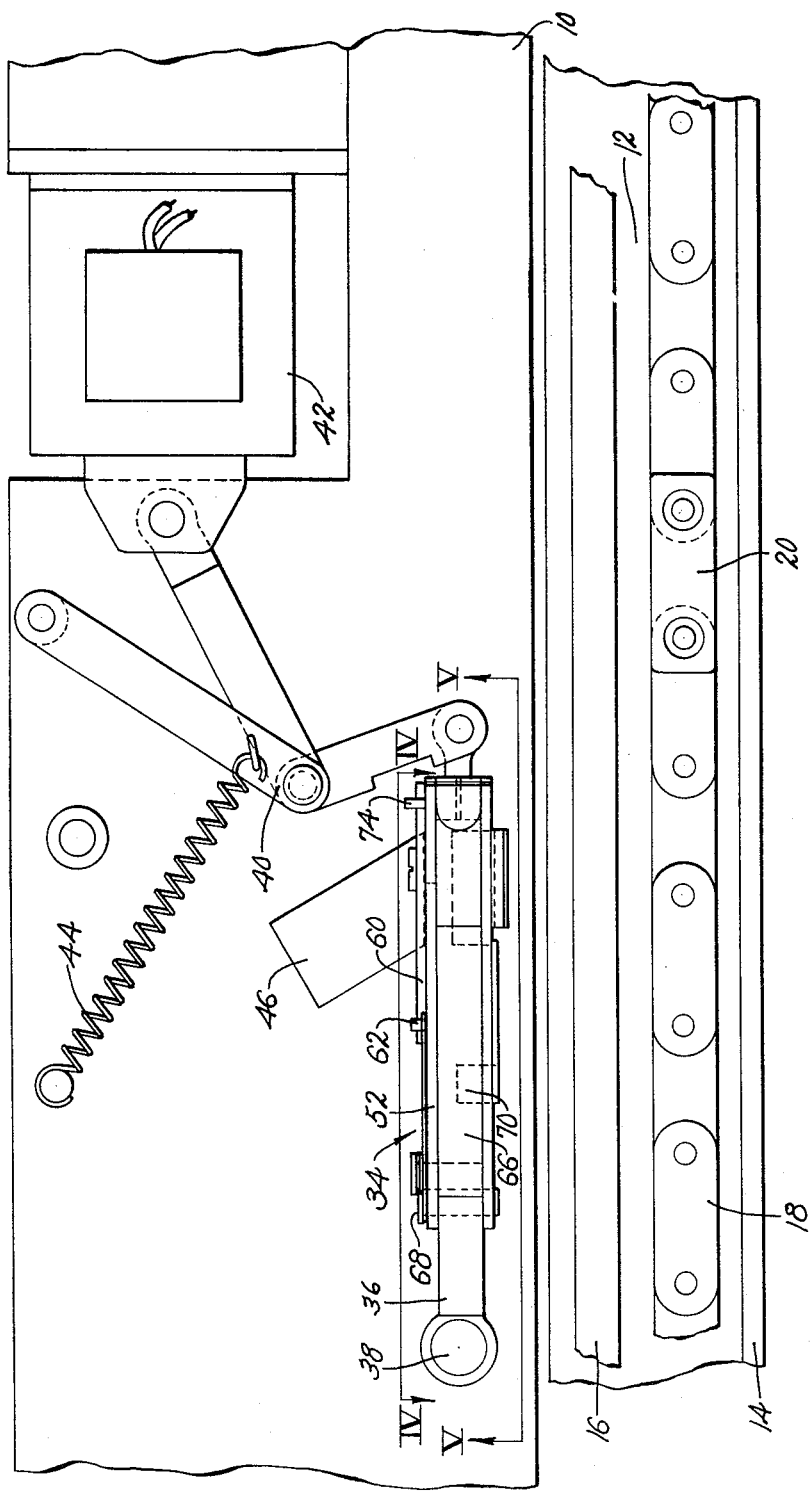

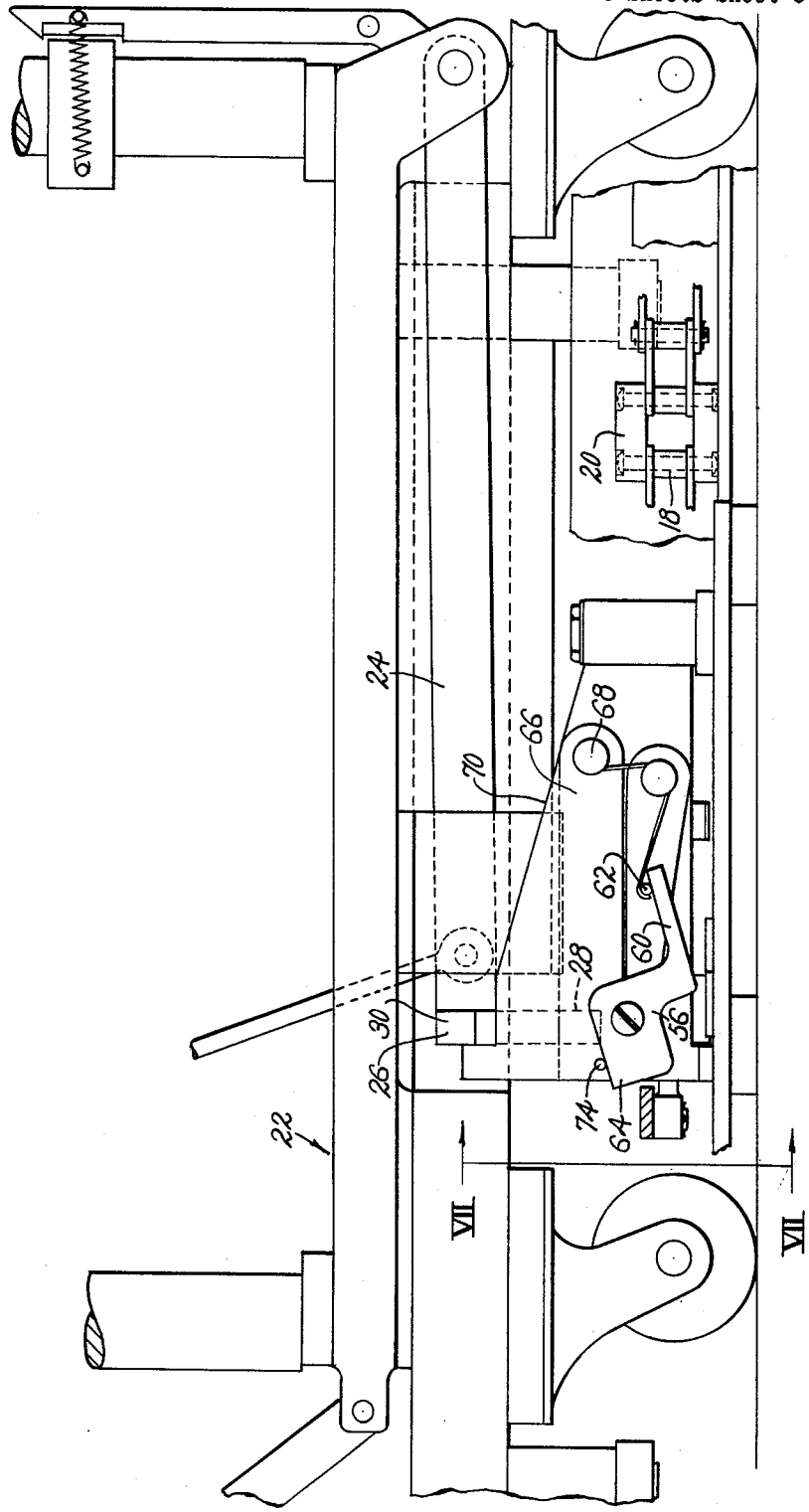

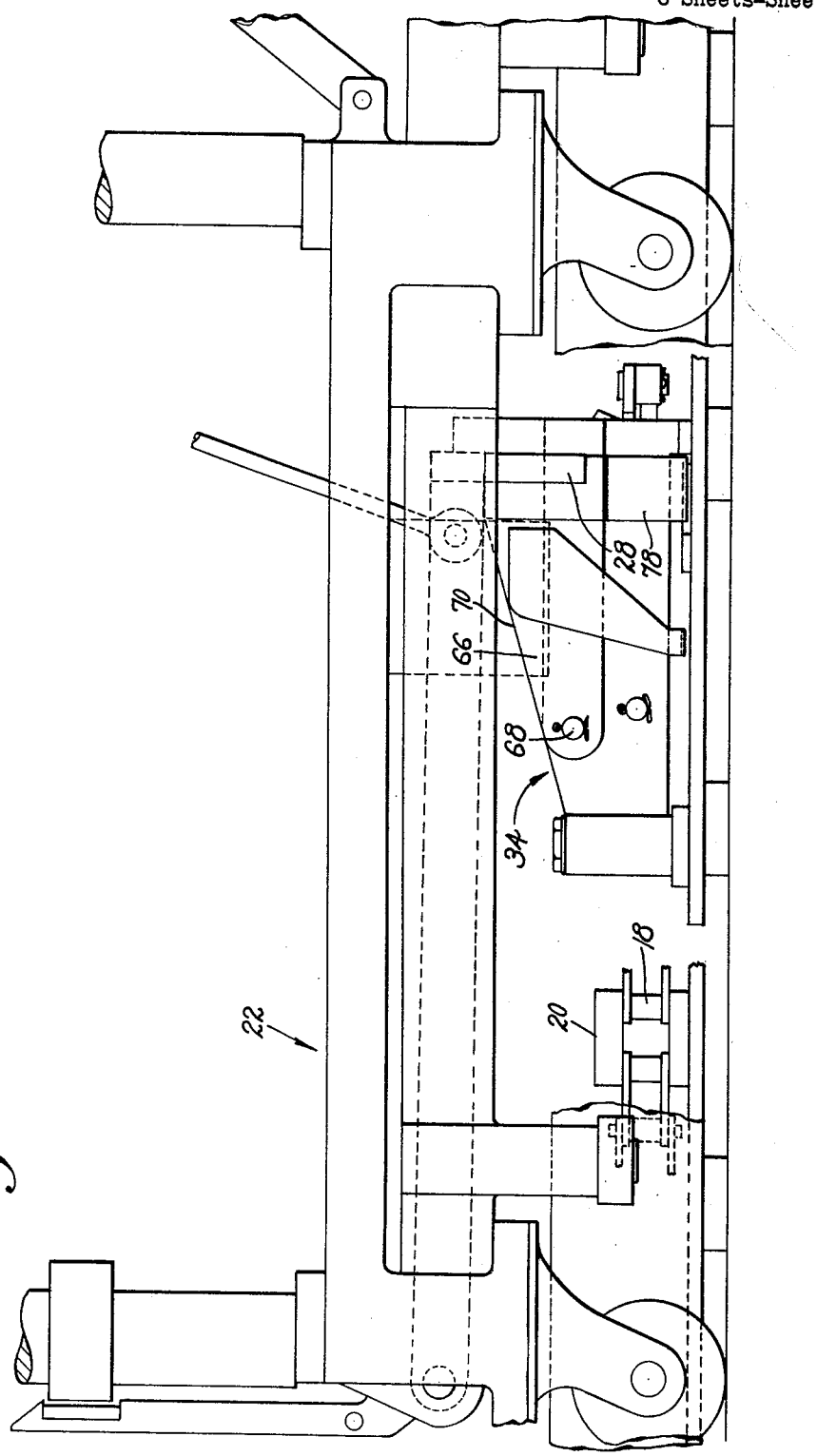

3,158,105
CONVEYOR APPARATUS
Joseph Robbins and Frank Richard Smith, Leicester, England, assignors to United Shoe Machinery Corporation, Flemington, N.J., a corporation of New Jersey
Filed Sept. 5, 1962, Ser. No. 221,552
Claims priority, application Great Britain May 12, 1962
2 Claims. (Cl. 104—172)

This invention relates generally to conveyor systems, of the type in which article carrying racks are moved between work stations by a conveyor chain, and has particular reference to a stop mechanism for automatically disconnecting a rack from the conveyor chain.

In a co-pending application, Serial No. 158,682, filed December 12, 1961 by Sidney A. Goodrich, Albert E. Lovett, Reginald T. Moore, and one of the present joint inventors, Frank R. Smith, there is disclosed a work handling system comprising individual shoe racks which are adapted to be moved between work stations by a floor mounted conveyor chain. The racks are each provided with a towing mechanism adapted for engagement by bosses on the chain, and a stop mechanism is provided alongside the chain at each work station, said stop mechanism being actuatable by an operator into a position such that the stop member engages the towing mechanism of a rack arriving at the work station and causes it to be released from the chain. One form of stop member disclosed therein has electrically controlled means to cause the stop member to return to an inoperative position when the rack has been moved away from operating relation to the conveyor.

The object of this invention is to provide an improved stop member for use with a conveyor system of the type described.

A further object of the invention is to provide a stop member for the purpose described which has mechanical means for latching itself in the stop position, and means responsive to the arrival of a rack at the stop member for releasing said mechanical latch means.

A further object of the invention is to provide a stop member for the purpose described which has first means for latching itself in the stop position, and means responsive to the arrival of a rack at the stop member for releasing said first latch means and for engaging second latch means which is automatically releasable on removal of the rack from the stop member.

Other objects of the invention will be apparent to one skilled in the art from the following detailed description of a specific embodiment thereof.

In the drawing:

FIG. 3 is a view similar to FIG. 1, with the stop mechanism disposed in the stop position;

FIG. 6 is a view similar to FIG. 4, in which a rack being towed by the chain has been stopped by the stop mechanism and the stop mechanism latch disengaged by the rack latch plate;

FIG. 8 is a view of FIG. 6 as seen from the rear side.

Figure 1:
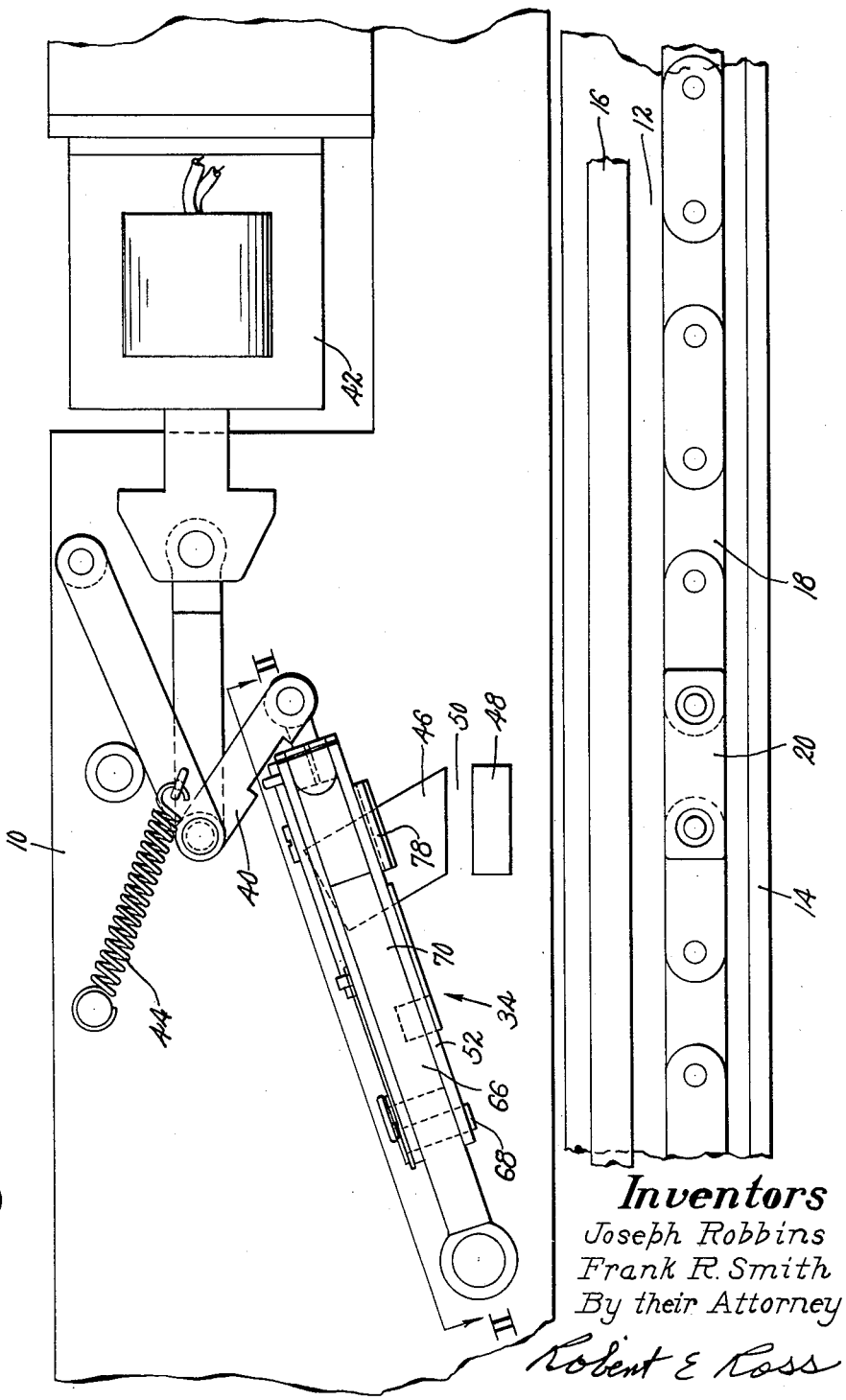
FIG. 1 is a top plan view of a portion of a conveyor chain and an associated stop member embodying the features of the invention, with said stop member being disposed in the pass position.

Referring to the drawing, there is illustrated a portion of a drag-line type conveyor system which comprises an elongated platform 10 having a channel 12 formed by a pair of upstanding members 14 and 16 disposed alongside said platform. Disposed within the channel 12 is a tow chain 18 adapted for longitudinal movement therein by suitable drive means, (not shown) said chain having upstanding drive lugs 20.

Figure 7:
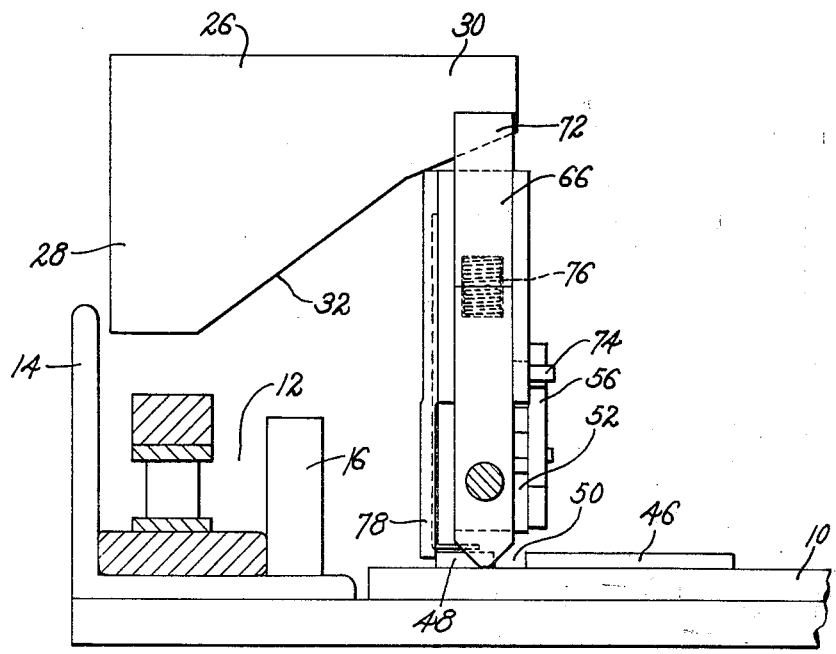
FIG. 7 is a view taken on line VII—VII of FIG. 6, with certain parts omitted for clarity.

The chain 18 is adapted to tow article carrying devices such as shoe racks 22 or the like. As described in the above-identified application, the racks 22 are provided with a towing arm 24 (FIG. 6), pivoted at the rear end to the rack frame, and having a latch plate 26 disposed on the forward end. The latch plate is provided with a depending portion 28 adapted for engagement by a drive lug 20 when the arm is in the lowered position, a lateral extending portion 30 (FIG. 7) for operating a stop mechanism in a manner to appear hereinafter, and an inclined portion 32 extending between the laterally extending portion 30 and the depending portion 28 to enable the latch plate to cam itself over the upstanding member 14 when the rack is moved sideways into operative relation to the tow chain.

To provide means for stopping a rack being towed by the chain and to effect the disengagement of the latch plate from the tow chain a stop mechanism 34 may be positioned alongside the chain. The stop mechanism 34 comprises support arm 36 pivoted at 38 for horizontal swinging movement between a pass position (see FIGS. 1 and 2) in which the arm is swung away from the chain so that a rack being towed by the chain is permitted to pass without engagement of the latch plate on the rack with the stop mechanism, and a stop position in which the arm is swung into position parallel with the chain in position to arrest the movement of a rack in a manner to appear hereinafter. The arm may be moved between the pass and stop positions by any convenient means which in the illustrated embodiment comprises a toggle 40 actuated by means of a solenoid 42 and a spring 44. The arm is normally maintained in the pass position by spring 44, and is moved to the stop position by energization of solenoid 42. As described in the above-identified application, in the usual installation, it is convenient to provide a solenoid actuating switch at a work station adjacent to the stop member which may be momentarily closed by the operator at the work station to set the stop member so as to arrest the next rack. For this reason it is desirable to have means for latching the stop member in the stop position after actuation of the solenoid, so that when the solenoid is de-energized the stop member is retained in the stop position. For this purpose a plate 46 is disposed under the forward end of the arm which terminates in spaced relation to a stop block 48 leaving a recess 50 disposed therebetween. A latch arm 52 is provided on the support arm, pivoted thereto at 54, so that the forward end thereof rests on the plate 46 when the stop member is in the pass position and drops into the recess 50 when the stop member moves to the stop position, to retain said member in the stop position against the force of toggle spring 44.

To permit the arrival of a rack at the work station to reset the mechanism so that the stop member will automatically return to the pass position when the rack is removed, a lever 56 is mounted on the support arm 36 at pivot 58 and comprises a rearwardly extending portion 60 which extends under a pin 62 projecting from the latch arm 52, and a forwardly extending portion 64. A latch operating arm 66 is disposed on the support arm, being pivoted thereto at 68, and comprises a forwardly and upwardly inclined upper surface 70, an abutment 72, and an operating pin 74 resting on the forwardly extending portion 64 of the lever 56. The latch operating arm 66 is normally biased upwardly by means of a spring 76 resting on the upper side of the support arms, so that the weight of the latch operating arm does not normally bear on the lever 56.

As will be described hereinafter the latch operating arm 66 is adapted to be depressed by the latch plate of a rack arriving at the work station so that the pin 62 on the arm 66 forces the forwardly extending portion downwardly to lift the latch arm 52 out of the recess 50.

To retain the stop mechanism in the stop position after arrival of a rack and consequent release of the latch, a depending member 78 is provided on the latch operating arm 66, which is positioned to move downwardly into position behind the stop block 48 when the latch operating arm is depressed by the arrival of a rack. The lower end of said member 78 is so spaced laterally from the plane of the adjacent face of the stop block to permit the support arm to move a small distance toward the pass position, so that the latch arm 52 moves to a position over the end of the latch plate 46. Hence when the rack is subsequently removed from operative relation to the stop mechanism, the latch arm 52 cannot re-seat in the recess 50.

Figure 2:
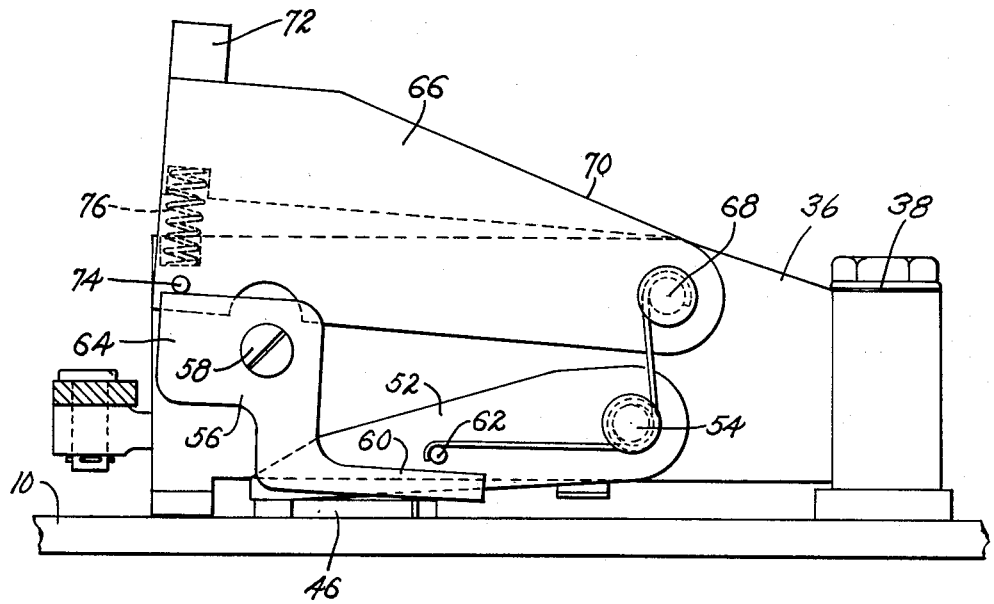
FIG. 2 is a view taken on line II—II of FIG. 1.
Figure 4:
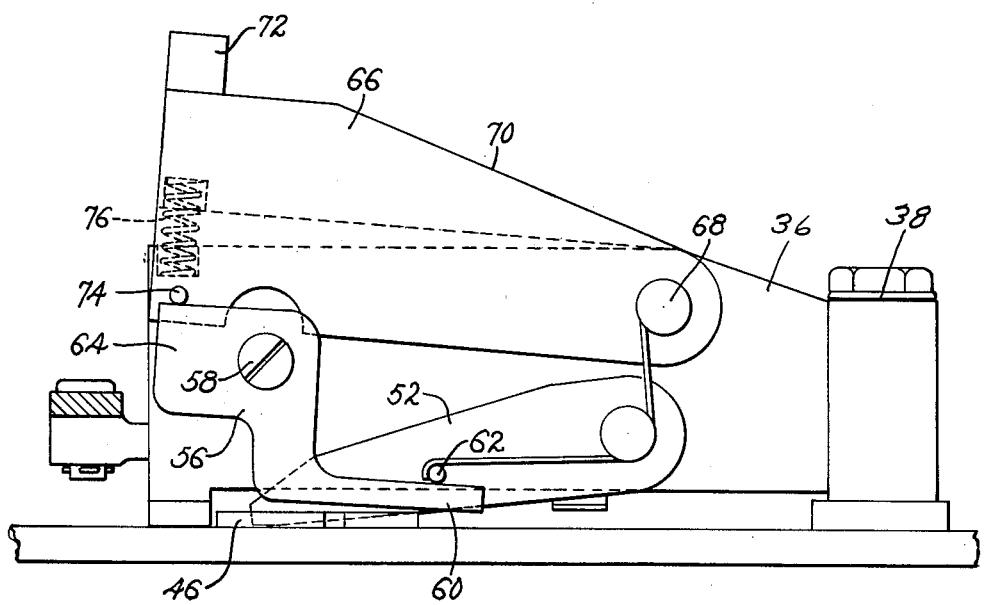
FIG. 4 is a view taken on line IV—IV of FIG. 3.
Figure 5:
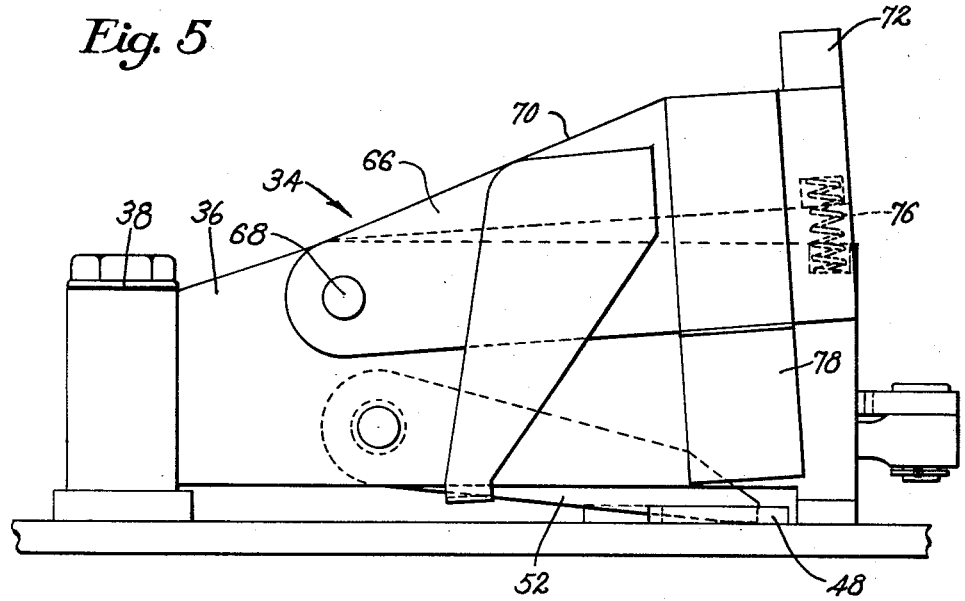
FIG. 5 is a view taken on line V—V of FIG. 3.

In a conveyor installation of the type described, a series of work stations disposed along the conveyor may each have a stop mechanism associated therewith on an adjacent portion of the conveyor. Each stop mechanism will normally be disposed in the pass position, as illustrated in FIGS. 1 and 2. When an operator at a work station needs a rack of articles to be operated on at the work station, he depresses a switch (not shown) at the work station to energize solenoid 42 which swings the support arm toward the conveyor chain until the latch arm 52 strikes the stop block 48 and drops into the recess 50. Thereafter the mechanism remains in the stop position after the solenoid is de-energized by the operator releasing the energizing switch. As described in the above-identified application, the closing of the switch energizing solenoid 42 may also be adapted to release a rack from a pool position, so that it is towed by the conveyor chain toward the actuated stop mechanism. As the latch plate on the rack towing arm arrives at the stop mechanism, the laterally extending portion 30 rides up the inclined surface 70 of the latch operating arm 66, thereby lifting the latch plate out of engagement with the chain. The weight of the towing arm also causes the latch operating arm to be depressed against the force of spring 76, thereby causing lever 56 to lift the latch arm 52 out of the recess 50 and causing the end of depending member 78 to seat behind stop block 48. When the operator observes that the rack of work has been arrested by the stop mechanism, he may remove the rack from operative relation to the conveyor, whereupon the spring 76 lifts the latch operating arm so that the depending member 78 is released from the stop block and the stop mechanism is swung back to its original position by the toggle spring 44.

Since certain changes may be made in the above illustrated embodiment of the invention without departing from the scope thereof, it is intended that all matter contained herein be interpreted in an illustrative and not in a limiting sense.

Having thus described our invention, what we claim as new and desire to secure by Letters Patent of the United States is:

1. A stop mechanism for use with a conveyor system of the type described, comprising a support arm mounted for lateral movement between a stop position in which the mechanism is in position for engagement with towing mechanism of an article carrying device to cause said mechanism to become disengaged from a towing chain and a pass position in which the mechanism is out of said position, means biasing said support arm to the pass position, a downwardly biased latch arm disposed on said support arm adapted to latch said arm in the stop position, an upwardly inclined disengaging member disposed on the support adapted to cam a towing mechanism of an article carrying device out of operative relation with the towing chain, said disengaging member being movable downwardly on engagement by said towing mechanism, and latch operating means responsive to said downward movement of the disengaging member to release said latch.

2. A stop mechanism for use with a chain conveyor system for racks of the type described, comprising a support arm movable between a pass position and a stop position, means responsive to the movement of said support arm to the stop position to engage a first latch means for retaining said arm in the stop position, means responsive to the arrival of a rack at the stop mechanism to effect disengagement of the rack from the conveyor chain, means responsive to the arrival of the rack at the stop mechanism to disengage said first means for retaining said arm in the stop position and engage a second latch means for retaining said rack in the stop position, means responsive to the removal of the rack from operative relation to the conveyor to release said second latch means.

References Cited in the file of this patent

UNITED STATES PATENTS 2,619,916      Rainier _____ Dec. 2, 1952